(12) United States Patent
Yu

(10) Patent No.: US 7,012,400 B2
(45) Date of Patent: Mar. 14, 2006

(54) CONTROL CIRCUITRY FOR CONTROLLING ROTATIONAL SPEED OF A DC MOTOR

(75) Inventor: Shou-Te Yu, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/855,390

(22) Filed: May 28, 2004

(65) Prior Publication Data

US 2004/0213558 A1    Oct. 28, 2004

Related U.S. Application Data

(63) Continuation of application No. 10/212,119, filed on Aug. 6, 2002, now abandoned.

(51) Int. Cl.
*H02P 7/42* (2006.01)
(52) U.S. Cl. .................. 318/800; 318/472; 318/473; 318/471; 318/461
(58) Field of Classification Search ............... 388/800; 318/434, 471, 472, 461, 473, 800
See application file for complete search history.

(56) References Cited

U.S. PATENT DOCUMENTS

| | | | |
|---|---|---|---|
| 3,761,792 A | 9/1973 | Whitney et al. | 318/221 |
| 4,350,940 A | 9/1982 | Dupont | 318/903 |
| 4,806,832 A * | 2/1989 | Muller | 388/833 |
| 4,839,754 A | 6/1989 | Gami et al. | 360/73.01 |
| 5,248,897 A * | 9/1993 | Lee | 307/10.1 |
| 5,410,229 A | 4/1995 | Sebastian et al. | 318/434 |
| 5,942,866 A * | 8/1999 | Hsieh | 318/268 |
| 5,966,001 A * | 10/1999 | Maehara et al. | 322/28 |
| 6,275,400 B1 * | 8/2001 | O Breartuin | 363/126 |
| 6,327,425 B1 * | 12/2001 | Strobel | 318/471 |
| 6,396,231 B1 * | 5/2002 | Horng et al. | 318/471 |
| 6,617,818 B1 * | 9/2003 | Hsu et al. | 318/599 |
| 6,674,369 B1 * | 1/2004 | Riddoch | 340/648 |
| 2002/0109475 A1 * | 8/2002 | Horng et al. | 318/473 |
| 2003/0175017 A1 | 9/2003 | Pelonis | |

\* cited by examiner

*Primary Examiner*—Rita Leykin
(74) *Attorney, Agent, or Firm*—Birch, Stewart, Kolasch & Birch, LLP

(57) ABSTRACT

A control circuitry, electrically connected to a DC motor and a variable voltage source for modulating a rotational speed of the DC motor. The control circuitry includes a voltage reference component and a switching circuit. The voltage reference component is electrically connected with the variable voltage source and provides a predetermined reference voltage. The switching circuit is electrically connected with the DC motor and the voltage reference component. The switching circuit is "OFF" when a voltage given by the variable voltage source is lower than the predetermined reference voltage so that the DC motor operates with a first operation mode, and the switching circuit is "ON" when the voltage given by the variable voltage source is higher than the predetermined reference voltage so that the DC motor operates with a second operation mode.

20 Claims, 6 Drawing Sheets

US 7,012,400 B2

CONTROL CIRCUITRY FOR CONTROLLING ROTATIONAL SPEED OF A DC MOTOR

This application is a Continuation of application Ser. No. 10/202,119, filed on Aug. 6, 2002, Abandoned and for which priority is claimed under 35 U.S.C. § 120; and this application claims priority of Application No. 091207569 filed in Taiwan, R.O.C. on May 24, 2002 under 35 U.S.C. § 119; the entire contents of all are hereby incorporated by reference.

BACKGROUND OF THE INVENTION

1. Field of the Invention

The invention provides a control circuitry for controlling the rotational speed of a DC motor, and more particularly to a control circuitry that modulates the rotational speed by switching the operation mode of a DC motor.

2. Related Art

The processing and spreading of vast amounts of electronic data has facilitated the rapid exchange of information and knowledge, accelerated technological development and enriched our lives. However, when processing large numbers of data transfers, the central processing unit (CPU) of a laptop computer, for example, is prone to overheating. Therefore, it is essential that devices like laptop computers have an excellent heat dissipation device with minimal power consumption to eliminate the problem of overheating.

Referring to FIG. 1, it is a block diagram of a heat-dissipating process of a CPU 12 as performed by a conventional heat dissipation device 10. As shown in FIG. 1, the heat dissipation device 10 includes a DC motor 14, a driving circuit 16 and a fan 18. The driving circuit 16 and the fan 18 are both electrically connected to the DC motor 14. When the heat dissipation device 10 dissipates heat from the CPU 12, the driving circuit 16 firstly transmits a rotation signal, usually a current signal, in order to control the rotation of the DC motor 14. Next, the fan 18 rotates in accordance with the rotation of the DC motor 14 to cool the CPU 12.

Generally, the fan 18 is directly disposed on the DC motor 14, so that the rotational speed of the fan 18 is same as the rotational speed of the DC motor 14. When heat generated by the CPU 12 increases, the current signal outputted from the driving circuit 16 increases gradually, and the rotational speed of the DC motor 14 and the fan 18 increases as well. When the heat generated by the CPU 12 is relatively small, such as when little data is being processed, the DC motor 14 is not required to turn as fast. So, the driving circuit 16 outputs a less current to the DC motor 14 for powersaving.

Normally, the characteristics of a DC motor are set after the design stage, and a direct proportion is between the input voltage and the rotational speed of the DC motor. Referring to FIG. 2, it is a graph of input voltage versus rotational speed of the DC motor 14. Suppose that the relationship between the input voltage and rotational speed of the DC motor 14 is represented by a characteristic curve $T_1$ So, when the input voltage to the DC motor 14 is 5 volts, the rotational speed of the DC motor 14 is 4000 rpm, and when the input voltage to the DC motor 14 is 2.5 volts, the rotational speed of the DC motor 14 is 2000 rpm. However, the rotational speed of the DC motor 14 is relatively too high at low input voltage (i.e. the input current is relatively too high).

The coil windings inside the DC motor 14 can be redesigned in order to reduce the motor's rotational speed at low input voltages. For example, the DC motor 14 can be designed to operate at 1500 rpm for an input voltage of 2.5 volts and the relationship between the input voltage and rotational speed of the redesigned DC motor 14 follows a new characteristic curve $T_2$. Although the goal of dropping the rotational speed at lower input voltages has been achieved by following the characteristic curve $T_2$, the rotational speed at higher voltages has been greatly compromised. As shown in FIG. 2, the rotational speed at an input voltage of 5 volts is only 3500 rpm.

OBJECT OF THE INVENTION

In light of the abovementioned issues, the object of the invention is to provide a control circuitry for controlling the rotational speed of a DC motor. The invention achieves the object with a simple design, few electronic components and no modifications to the original design of the DC motor.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow and the accompany drawings, which are given by way of illustration only, and thus are not limitative of the present invention, and wherein.

DETAILED DESCRIPTION OF THE INVENTION

First Example

Figure 3:
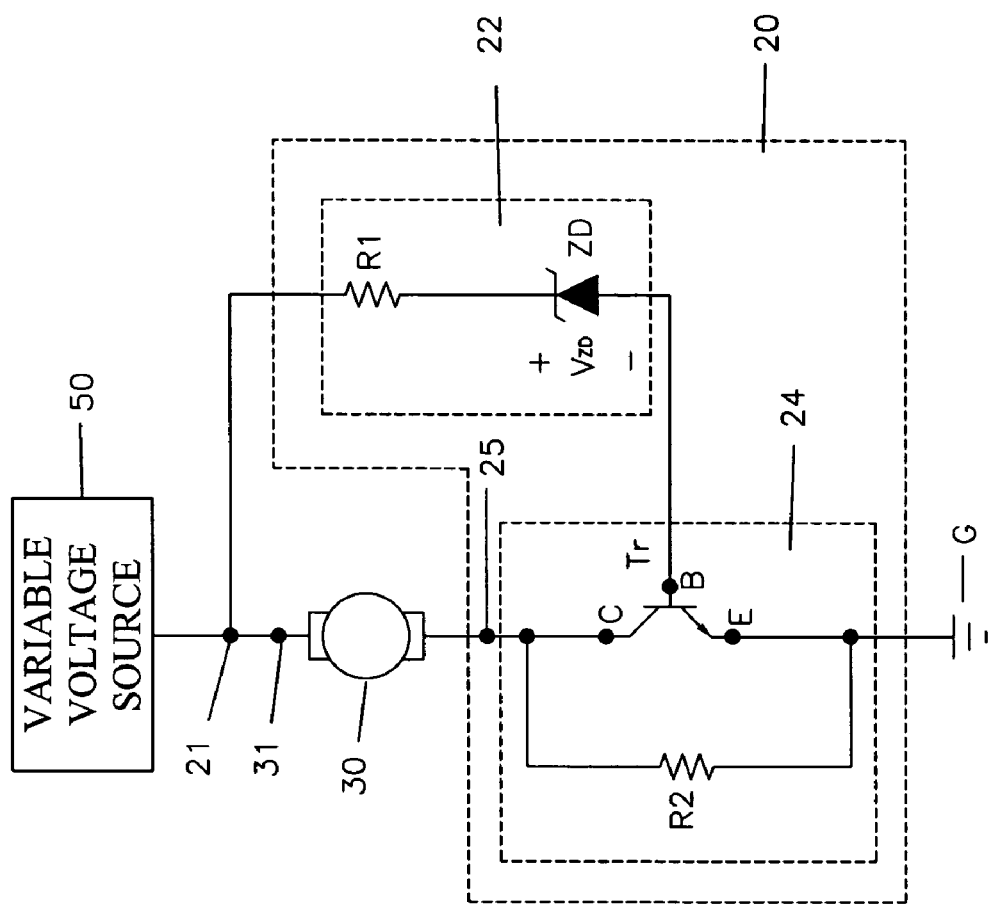
FIG. 3 is a circuit diagram of control circuitry applied to a DC motor according to the first embodiment of the present invention.

Referring to FIG. 3, it is a circuit diagram of a control circuitry 20 applied to a DC motor 30 according to the first embodiment of the present invention. As shown in FIG. 3, the control circuitry 20 includes a voltage reference component 22 and a switching circuit 24 and is electrically connected to the DC motor 30 and a variable voltage source 50. The voltage reference component 22 and the DC motor 30 are respectively electrically connected to the variable voltage source 50 via an input node 21, and an input node 31. The voltage reference component 22 provides a predetermined reference voltage. The switching circuit 24 is electrically connected with the DC motor 30 via a connector node 25, the voltage reference component 22, and ground via a ground node G.

The voltage reference component 22 is a preferred Zener diode (ZD), which provides a predetermined reference voltage $V_{zd}$. Between the cathode of the Zener diode and the input node 21, there is usually a current-limiting resistor $R_1$, which increases the resistance of the voltage reference component 22, effectively limiting the current through the Zener diode (ZD) and thus lengthening the life of the Zener diode.

The switching circuit 24 is used to control the ON/OFF state. The switching circuit 24 preferably includes an NPN bipolar junction transistor (BJT), symbolized as "Tr", and a voltage drop component, such as a resistor $R_2$. The base B of the transistor Tr is electrically connected to the voltage reference component 22. The collector C and the emitter E are electrically connected to the connector node 25 of the DC motor 30 and the ground node G respectively. Further, the resistor $R_2$ is electrically connected across the switching circuit 24 and provides a voltage difference between the collector C and the emitter E of the transistor Tr in the switching circuit 24. Alternately, the resistor $R_2$ can be a Zener diode or any component with a resistance.

Figure 1:
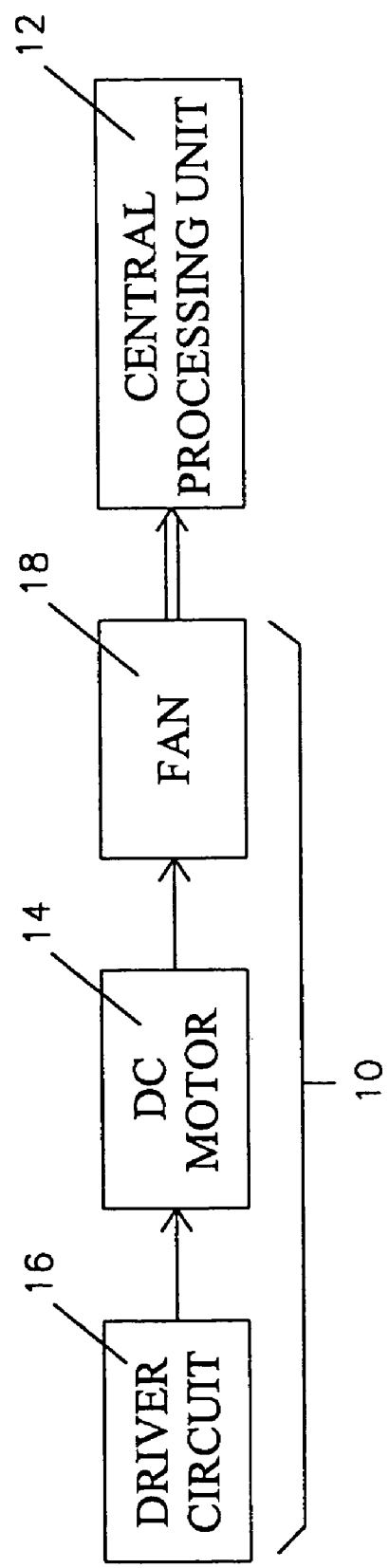
FIG. 1 is a block diagram of a heat-dissipating process of a CPU as performed by a conventional heat dissipation device.
Figure 2:
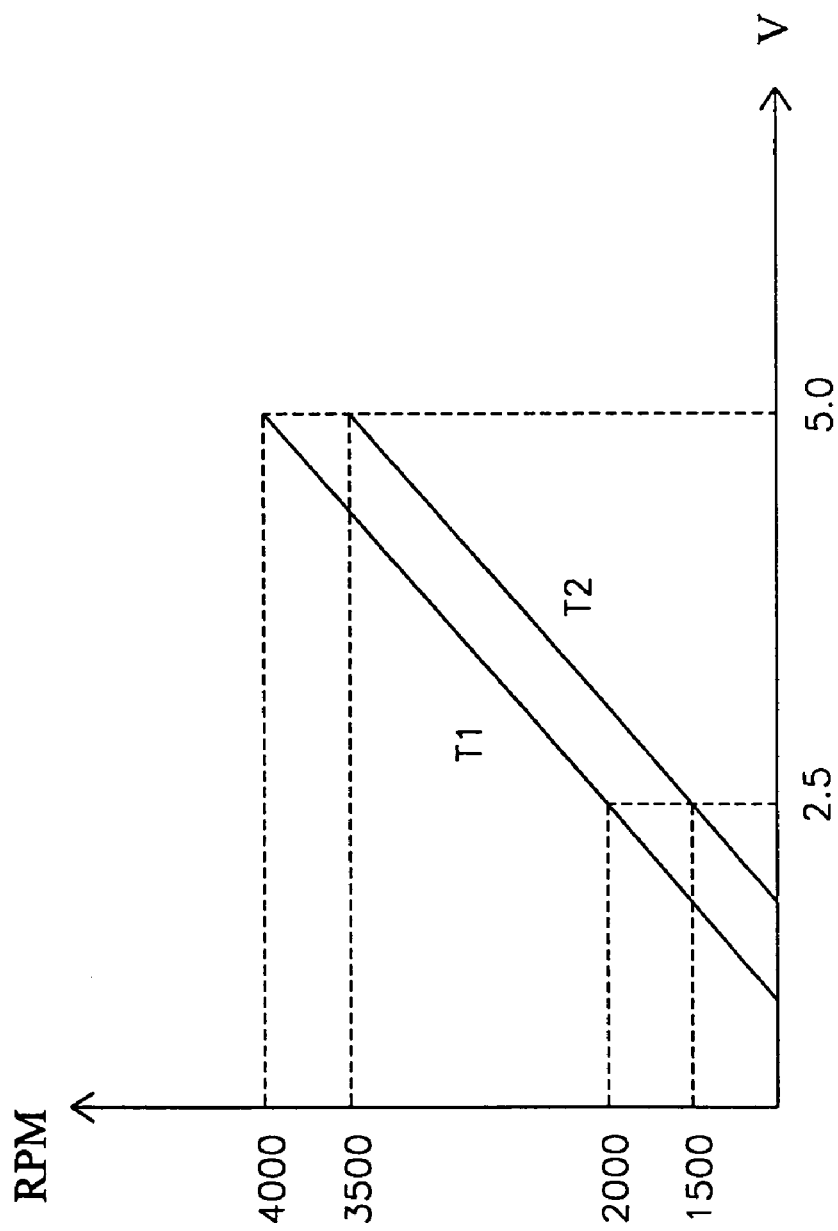
FIG. 2 is a graph of the relationship between the input voltage and rotational speed of the DC motor.
Figure 4:
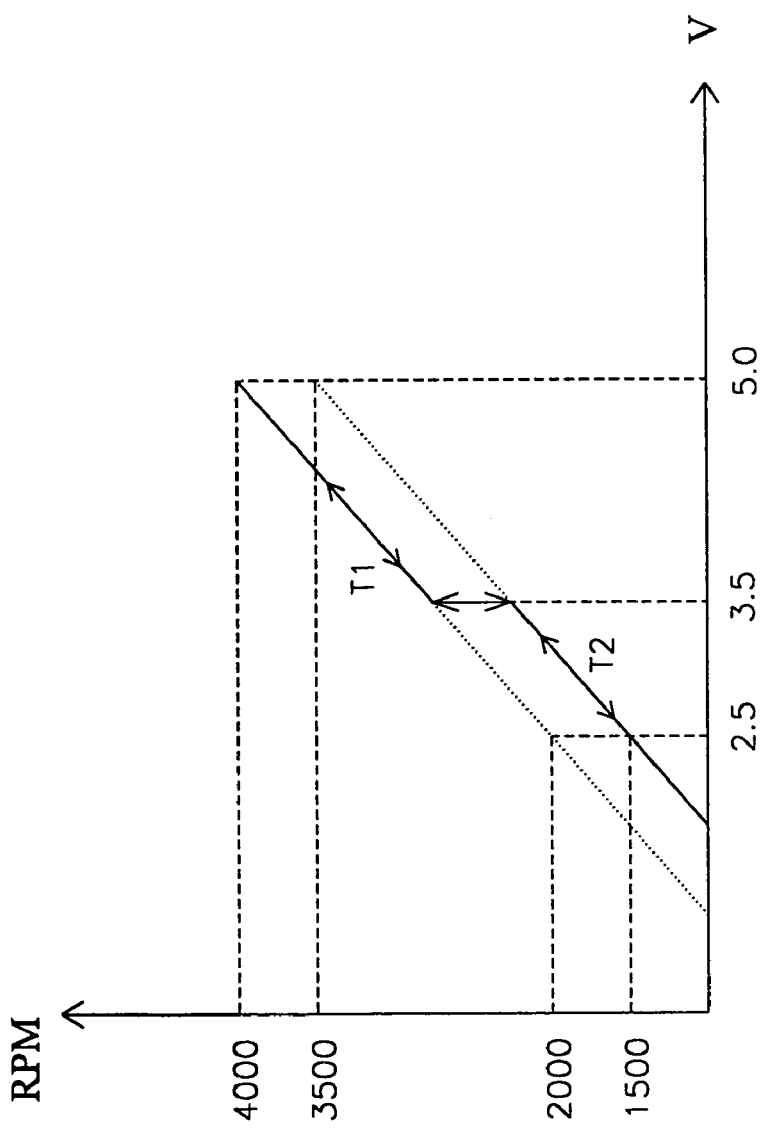
FIG. 4 is a graph of the relationship between the input voltage and rotational speed of the DC motor depicted in FIG. 3.

FIG. 4 is a graph of the relationship between the input voltage and rotational speed of the DC motor 30 of the first embodiment. Referring to FIGS. 2, 3, and 4 together, the components of the control circuitry 20 described hereinafter shall assume values as described in FIG. 2 for ease of explanation of the operating principles. As shown in FIGS. 3 and 4, assume that the reference voltage of the Zener diode (ZD), $V_{zd}$, is 3 volts and the DC motor 30 is designed by following the characteristic curve $T_2$.

When the variable voltage source 50 outputs a voltage of 2.5 volts to the DC motor 30, the rotational speed of the DC motor 30 is 1500 rpm. At this point, the input voltage is less than the reference voltage $V_{zd}$ (3 volts), so that the NPN bipolar junction transistor (BJT), Tr, of the switching circuit 24 is "OFF". As a result, the current outputted from the variable current source 50 to ground flows through the DC motor 30, the resistor $R_2$ and the ground node G, and the motor 30 operates according to the characteristic curve $T_2$.

On the other hand, when the variable voltage source 50 outputs a voltage greater than the sum of the potential difference across the current limiting resistor $R_1$ and the reference voltage $V_{zd}$, for example, 3.5 volts, the Zener diode conducts to switch the NPN BJT Tr on, so that the switch circuit 24 is "ON". The current outputted from the variable voltage source 50 to ground mostly flows through the DC motor 30, the collector C of the BJT Tr, the emitter E of the BJT Tr, and the ground node G, while only a little amount of current flows through the Zener diode ZD and resistor $R_2$. As a result, the DC motor 30 operates by following the characteristic curve $T_2$ being switched to the characteristic curve $T_1$, and the rotational speed of the motor is reached to 4000 rpm when the variable voltage source 50 provides an input of 5 volts.

Second Example

Figure 5:
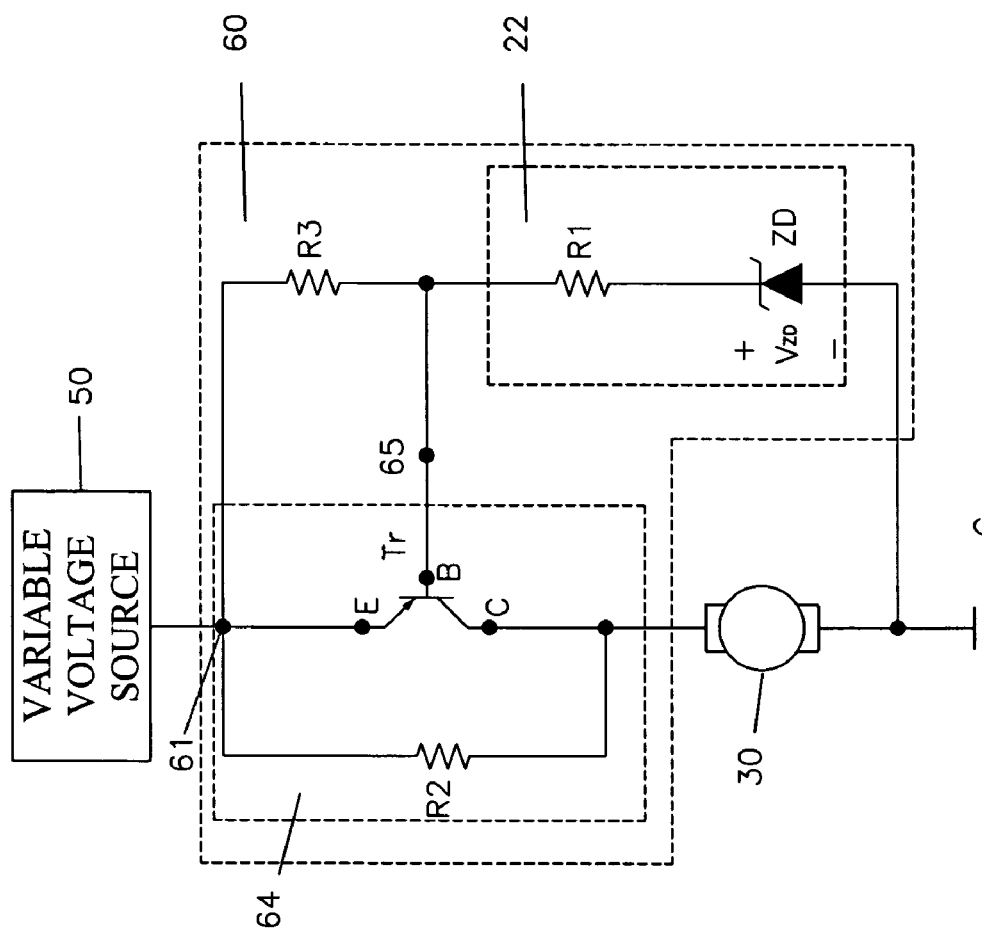
FIG. 5 is a circuit diagram of control circuitry applied to the DC motor according to the second preferred embodiment of the present invention.

Referring to FIG. 5, it is a circuit diagram of control circuitry 60 applied to the DC motor 30 according to the second preferred embodiment of the present invention. The most significant difference between the first embodiment and the second is that the switching circuit of the second embodiment of the control circuitry 60 adopts a PNP BJT. As shown in FIG. 5, the control circuitry 60 comprises an input node 61 electrically connected to the variable voltage source 50, a resistor $R_3$ electrically connected to the input node 61 across which a voltage difference develops due to the current generated from the variable voltage source 50, a voltage reference component 22 electrically connected between the resistor $R_3$ and ground, and a switching circuit 64 that is electrically connected between the input node 61 and the DC motor 30.

The voltage reference component 22 of the second embodiment is electrically connected with the variable voltage source 50 and ground and also utilizes a Zener diode ZD to provide a predetermined reference voltage $V_{zd}$. There is also a current-limiting resistor $R_1$ connected between the cathode of the Zener diode and the input node 21 that boosts the resistance of the voltage reference component 22 so as to reduce the current flowing through the Zener diode while it conducts, thereby lengthening the lifetime of the Zener diode (ZD).

The switching circuit 64 is electrically connected with the variable voltage source 50, the DC motor 30 and the voltage reference component 22. The switching circuit 64 includes a PNP BJT, Tr, and a voltage drop component, $R_2$. The base B of the transistor Tr is electrically connected to the connector node 65, and the collector C and the emitter E are connected to the DC motor 30 and the input node 61 of the control circuitry 60 respectively.

When the input voltage outputted from the variable voltage source 50 is greater than the sum of the potential difference across the resistor R3, the current limiting resistor $R_1$ and the reference voltage $V_{zd}$, the switching circuit 64 is "ON". The current outputted from the variable voltage source 50 to ground flows to the DC motor 30 through either the collector C or emitter E of the PNP transistor Tr. Additionally, a resistor $R_2$ connected across the switching circuit 64 functions as a voltage drop component, thus ensures a voltage difference between the collector C and the emitter E. Since the purpose of the voltage drop component is to provide a voltage difference between the collector C and the emitter E of the transistor Tr of the switching circuit 64, the voltage drop component can also be a Zener diode or any other component with resistive characteristics.

Figure 6:
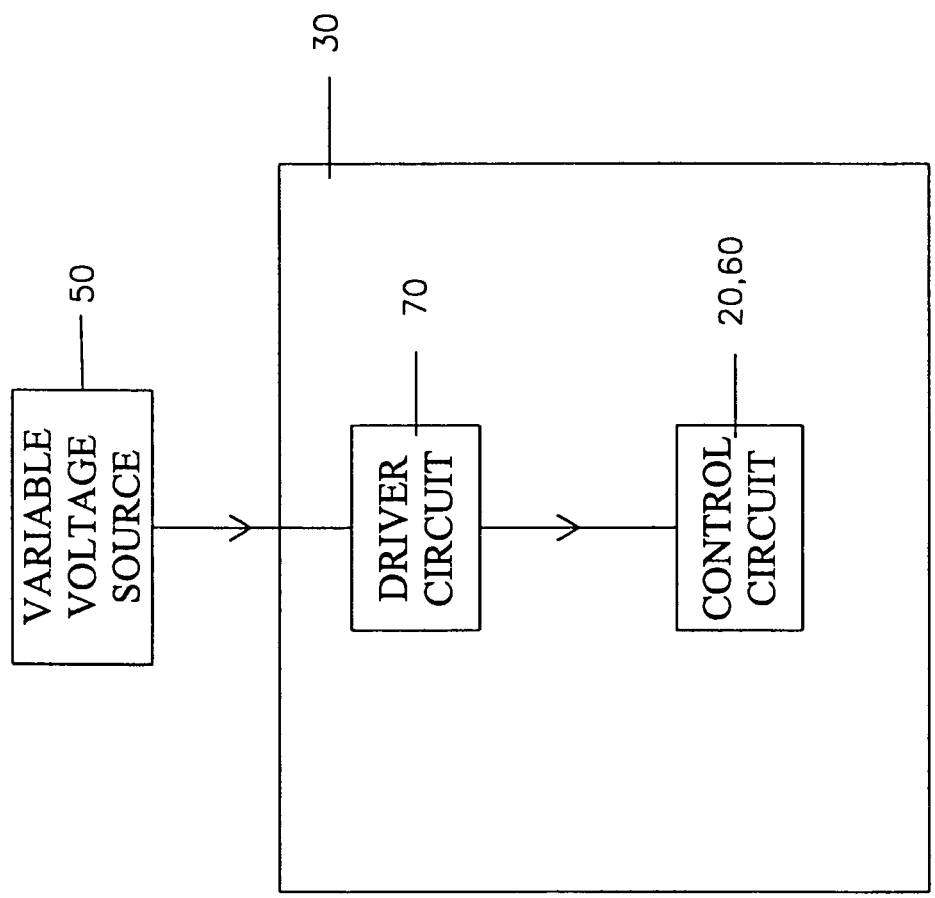
FIG. 6 is a block diagram of control circuitry applied to the DC motor according to the third preferred embodiment of the present invention.

The control circuitry 20/60 can be applied to the DC motor 30 by being built-in inside of the DC motor 30 or being separate from the DC motor 30. Referring to FIG. 6, it is a block diagram of control circuitry applied to the DC motor according to the third preferred embodiment of the present invention. A driving circuit 70 and the control circuitry 20/60 can be both built-in belonged in the DC motor 30 and both electrically connected to the DC motor 30. The driving circuit 70 transmits a current signal to control the control circuitry 20/60 for modulating the rotation of the DC motor 30

The switching circuits 24 and 64 of the invention have only been embodied with NPN and PNP BJTs Tr only. However, it is not limited to the present invention, for example, the switching circuits 24 and 64 could include a PMOS transistor, NMOS transistor, or a relay as a switch, all of which fall within the spirit of the invention. In addition, with reference to FIGS. 3 to 5, when the switching circuits 24 and 64 are "OFF", the characteristics of the DC motor 30 are affected, aside from its original design, by the resistor $R_2$. That is, when a user needs to lower the rotational speed of the DC motor 30 for a given voltage, a larger resistor $R_2$ can be used to achieve this goal.

In contrast to the prior art, the most significant characteristic of the present invention is that the control circuitry 20 and 60 requires only the simplest electronic components to achieve the goal of modulating the rotational speed of a DC motor; no modifications to the internal windings of the motor or additional complex circuitry is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control circuitry, electrically connected to a DC motor and a variable voltage source for modulating a rotational speed of the DC motor, comprising:
    a voltage reference component, electrically connected with the variable voltage source and providing a predetermined reference voltage; and
    a switching circuit, electrically connected with the DC motor and the voltage reference component;
    wherein the switching circuit is "OFF" when a voltage given by the variable voltage source is lower than the predetermined reference voltage so that the DC motor operates with a first operation mode, and the switching circuit is "ON" when the voltage given by the variable voltage source is higher than the predetermined reference voltage so that the DC motor operates with a second operation mode.

2. The control circuitry according to claim 1, wherein the DC motor with the second operation mode operates at a higher rotational speed than with the first operation mode for a given voltage.

3. The control circuitry according to claim 1, wherein the voltage reference component includes a Zener diode.

4. The control circuitry according to claim 3, wherein the voltage reference component further includes a current limiting resistor electrically connected between the variable voltage source and the Zener diode.

5. The control circuitry according to claim 1, wherein the switching circuit includes an NPN bipolar junction transistor (BJT), an N-type metal oxide semiconductor (NMOS) transistor, a PNP BJT, a P-type metal oxide semiconductor (PMOS) transistor, or a relay.

6. The control circuitry according to claim 5, wherein the switching circuit further includes a voltage drop component electrically connected in parallel with the switching circuit for providing a voltage drop across the switching circuit and forming a current path from the DC motor to ground.

7. The control circuitry according to claim 6, wherein the voltage drop component is a resistor or a Zener diode.

8. A control circuitry, electrically connected to a DC motor and a variable voltage source for modulating a rotational speed of the DC motor, comprising:
    a voltage reference component, electrically connected with the variable voltage source and providing a predetermined reference voltage; and
    a switching circuit, electrically connected with the DC motor, the voltage reference component and ground;
    wherein the DC motor is electrically connected to the variable voltage source and ground respectively via the voltage reference component and the switching circuit so that the rotational speed of the DC motor is modulated;
    wherein the switching circuit is "OFF" when a voltage given by the variable voltage source is lower than the predetermined reference voltage so that the DC motor operates with a first operation mode, and the switching circuit is "ON" when the voltage given by the variable voltage source is higher than the predetermined reference voltage so that the DC motor operates with a second operation mode.

9. The control circuitry according to claim 8, wherein the DC motor with the second operation mode operates at a higher rotational speed than with the first operation mode for a given voltage.

10. The control circuitry according to claim 8, wherein the voltage reference component includes a Zener diode.

11. The control circuitry according to claim 10, wherein the voltage reference component further includes a current limiting resistor electrically connected between the variable voltage source and the Zener diode.

12. The control circuitry according to claim 8, wherein the switching circuit includes an NPN bipolar junction transistor (BJT), an N-type metal oxide semiconductor (NMOS) transistor, or a relay.

13. The control circuitry according to claim 12, wherein the switching circuit further comprises a voltage drop component electrically connected in parallel with the switching circuit for providing a voltage drop across the switching circuit and forming a current path from the DC motor to ground.

14. The control circuitry according to claim 13, wherein the voltage drop component is a resistor or a Zener diode.

15. A control circuitry, electrically connected to a DC motor and a variable voltage source for modulating a rotational speed of the DC motor, comprising:
    a voltage reference component, electrically connected with the variable voltage source and ground and providing a predetermined reference voltage; and
    a switching circuit, electrically connected with the variable voltage source, the DC motor and the voltage reference component,
    wherein the DC motor is electrically connected to the variable voltage source and ground respectively via the switching circuit and the voltage reference component so that the rotational speed of the DC motor is modulated;
    wherein the switching circuit is "OFF" when a voltage given by the variable voltage source is lower than the predetermined reference voltage so that the DC motor operates with a first operation mode, and the switching circuit is "ON" when the voltage given by the variable voltage source is higher than the predetermined reference voltage so that the DC motor operates with a second operation mode.

16. The control circuitry according to claim 15, wherein the DC motor with the second operation mode operates at a higher rotational speed than with the first operation mode for a given voltage.

17. The control circuitry according to claim 15, further comprising a resistor, electrically connected between the variable voltage source, the switching circuit and the voltage reference component, for forming a voltage drop between the variable voltage source and the switching circuit, and between the variable voltage source and the voltage reference component;
    wherein the switching circuit is "ON" when the voltage given by the variable voltage source is higher than the sum of the voltage drop that the resistor generated and the predetermined reference voltage.

18. The control circuitry according to claim 15, wherein the voltage reference component includes a Zener diode and a current limiting resistor electrically connected between the variable voltage source and the Zener diode.

19. The control circuitry according to claim 15, wherein the switching circuit includes a PNP BJT, a P-type metal oxide semiconductor (PMOS) transistor, or a relay.

20. The control circuitry according to claim 15, wherein the switching circuit further includes a resistor or a Zener diode electrically connected in parallel with the switching circuit for providing a voltage drop across the switching circuit and forming a current path from the DC motor to ground.

* * * * *